United States Patent
Takamura

[11] Patent Number: 6,018,632
[45] Date of Patent: Jan. 25, 2000

[54] ZOOM RATIO ADJUSTING DEVICE AND CAMERA EQUIPPED WITH THE SAME

[75] Inventor: Masashi Takamura, Saitama, Japan

[73] Assignee: Fuji Photo Film Co., Ltd., Kanagawa, Japan

[21] Appl. No.: 09/168,612

[22] Filed: Oct. 9, 1998

[30] Foreign Application Priority Data

Nov. 18, 1997 [JP] Japan ................................ 9-317478

[51] Int. Cl.[7] .................................................. G03B 17/00
[52] U.S. Cl. .............................................. 396/85; 396/299
[58] Field of Search ........................... 396/85, 297, 298, 396/299, 86, 87, 131

[56] References Cited

U.S. PATENT DOCUMENTS

| | | | |
|---|---|---|---|
| 3,517,597 | 6/1970 | Rauffer | 396/85 |
| 3,940,777 | 2/1976 | Komine | 396/85 |
| 4,445,757 | 5/1984 | Enomoto et al. | 396/86 |

*Primary Examiner*—W. B. Perkey
*Attorney, Agent, or Firm*—Young & Thompson

[57] ABSTRACT

A zoom ratio adjusting device includes a member movable between a telephoto end position and a wide-angle end position on opposite sides of a neutral position which is provided with a first and a second elastic arm, each arm being deformable while the zoom ratio adjusting member moves toward each of the telephoto end and wide-angle end positions to accumulate reactive force for returning the member to the neutral position and to hold the zoom ratio adjusting member in the neutral position.

17 Claims, 8 Drawing Sheets

ZOOM RATIO ADJUSTING DEVICE AND CAMERA EQUIPPED WITH THE SAME

BACKGROUND OF THE INVENTION

1. Field of the Invention

This invention relates to a photographic camera equipped with a zoom lens and a zoom ratio adjusting device for the camera.

2. Description of Related Art

Various types of compact cameras equipped with zoom lenses have been put on the market. Motor driven compact cameras of this kind are equipped with a zoom ratio adjusting switch button for actuating an electric motor in opposite direction to drive the zoom lens to adjust a zoom ratio. One type of motor driven compact camera has a single zoom ratio adjusting switch button for continuously moving the zoom lens back and forth to continuously varying a zoom ratio between a telephoto end and a wide-angle end while the zoom ratio adjusting switch button remains operated. This type of motor driven compact camera takes a relatively long time until the zoom lens is placed at a desired zoom ratio. Another type of motor driven compact camera has two zoom ratio adjusting switch buttons, namely a telephoto switch button and a wide-angle switch button, which is desirable to change the zoom ratio in any direction between a telephoto end and a wide-angle end from any lens position. However, providing two zoom ratio adjusting switch buttons is accompanied by an increase in the number of parts, which is always undesirable for compact cameras having a demand that it is made with a simple structure and manufactured at costs as low as possible.

In order to solve the structural and economic problems of the conventional compact cameras, it has been proposed to incorporate a single zoom ratio adjusting member movable between a telephoto end position and a wide-angle end position provided on opposite sides of a neutral position for actuating a zoom lens drive means such as an electric motor to drive the zoom lens toward a telephoto end while operated to the telephoto end position from the neutral position and to drive the zoom lens toward the wide-angle end while operated to the wide-angle end position from the neutral position. While the zoom ratio adjusting device enables the photographer to adjust the zoom ratio between the telephoto end and the wide-angle end from any lens position, however, it must be accompanied by means for returning the zoom ratio adjusting member to the neutral position after a conclusion of zoom ratio adjustment and holding it in the neutral position. This means includes metal springs in most cases, which increases manufacturing costs of the compact camera.

SUMMARY OF THE INVENTION

It is accordingly an object of the invention to provide a zoom ratio adjusting device for a compact camera equipped with a zoom lens which is simple in structure and reliable in operation and enables the compact camera to be manufactured at low costs.

The foregoing object of the invention are accomplished by a zoom ratio adjusting device for adjusting a zoom ratio of a zoom lens of a camera between a telephoto end and a wide-angle end which comprises a zoom ratio adjusting member movable between a telephoto end position and a wide-angle end position provided on opposite side of a neutral position for actuating the zoom lens drive means to drive the zoom lens toward the telephoto end while operated toward the telephoto end position from the neutral position and actuating the zoom lens drive means to drive the zoom lens toward the wide-angle end while operated toward the wide-angle end position from the neutral position. The zoom ratio adjusting member is integrally formed with elastic means which is deformable to accumulate reactive force for returning the zoom ratio adjusting member to the neutral position from each of the telephoto end position and the wide-angle end position while the zoom ratio adjusting member is operated toward the telephoto end position or toward the wide-angle end position and holds the zoom ratio adjusting member in the neutral position while the zoom ratio adjusting member is released.

BRIEF DESCRIPTION OF THE DRAWINGS

The above and other objects and features of the present invention will be understood from the following description of a specific embodiment thereof when considering in conjunction with the accompanying drawings, wherein same reference numbers are used to denote same parts or elements throughout the drawings and in which.

DETAILED DESCRIPTION OF THE SPECIFIC EMBODIMENT

Because parts or mechanisms which are not of direct importance to the invention and parts or mechanisms which are purely of conventional construction, for example the automatic focusing mechanism, the finder assembly, the shutter release mechanism, the lens drive mechanism, etc., are well known, the present description will be directed in particular to elements or mechanisms forming part of or cooperating directly with, the camera in accordance with the present invention. It is to be understood that elements or mechanisms not specifically shown or described can take various forms well known to those skilled in the photographic art.

Figure 1:
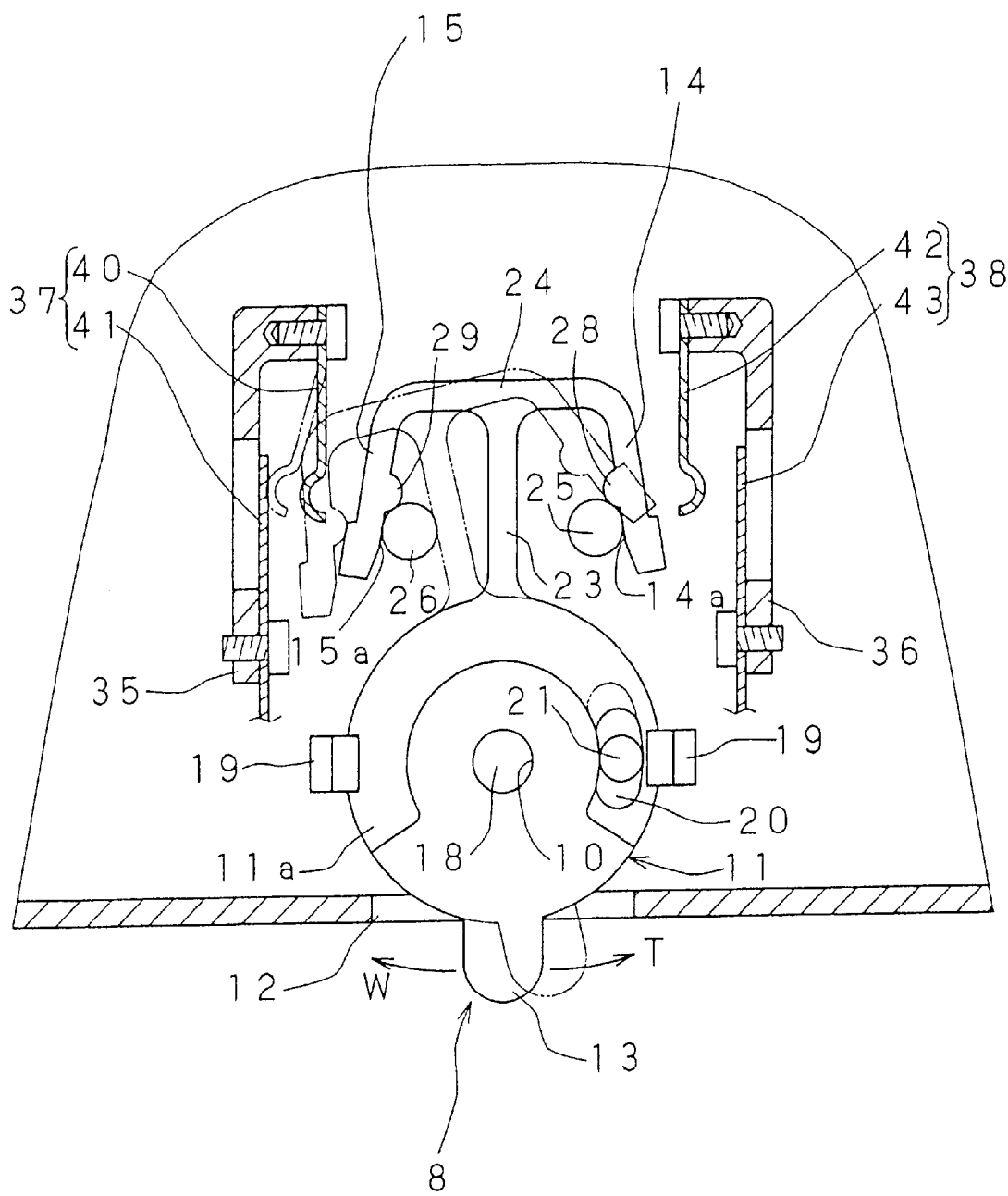
FIG. 1 is a cross-sectional view of essential part of a camera equipped with a zoom ratio adjusting device in accordance with a preferred embodiment of the invention.
Figure 2:
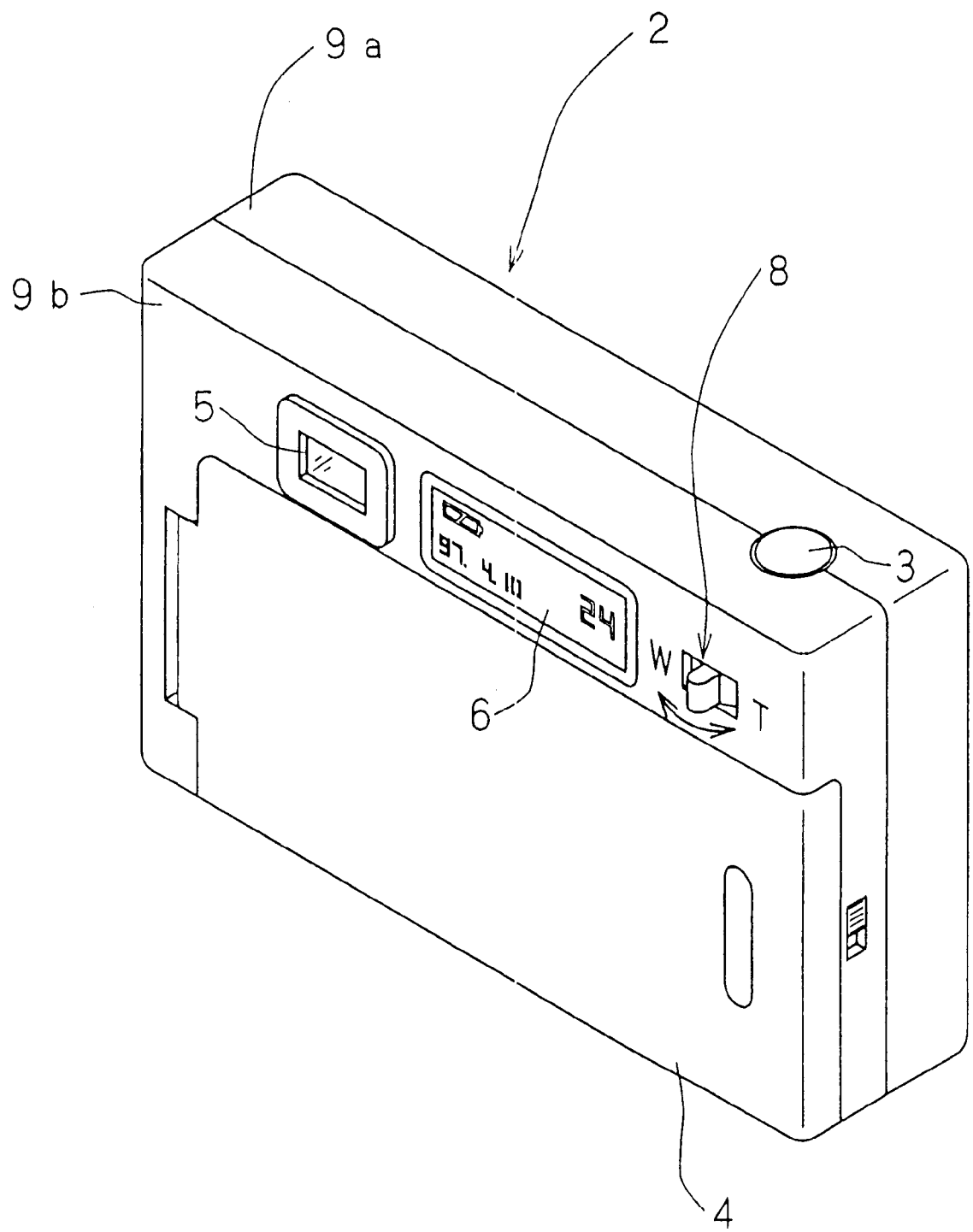
FIG. 2 is a rear view of a camera equipped with the zoom ratio adjusting device.
Figure 3:
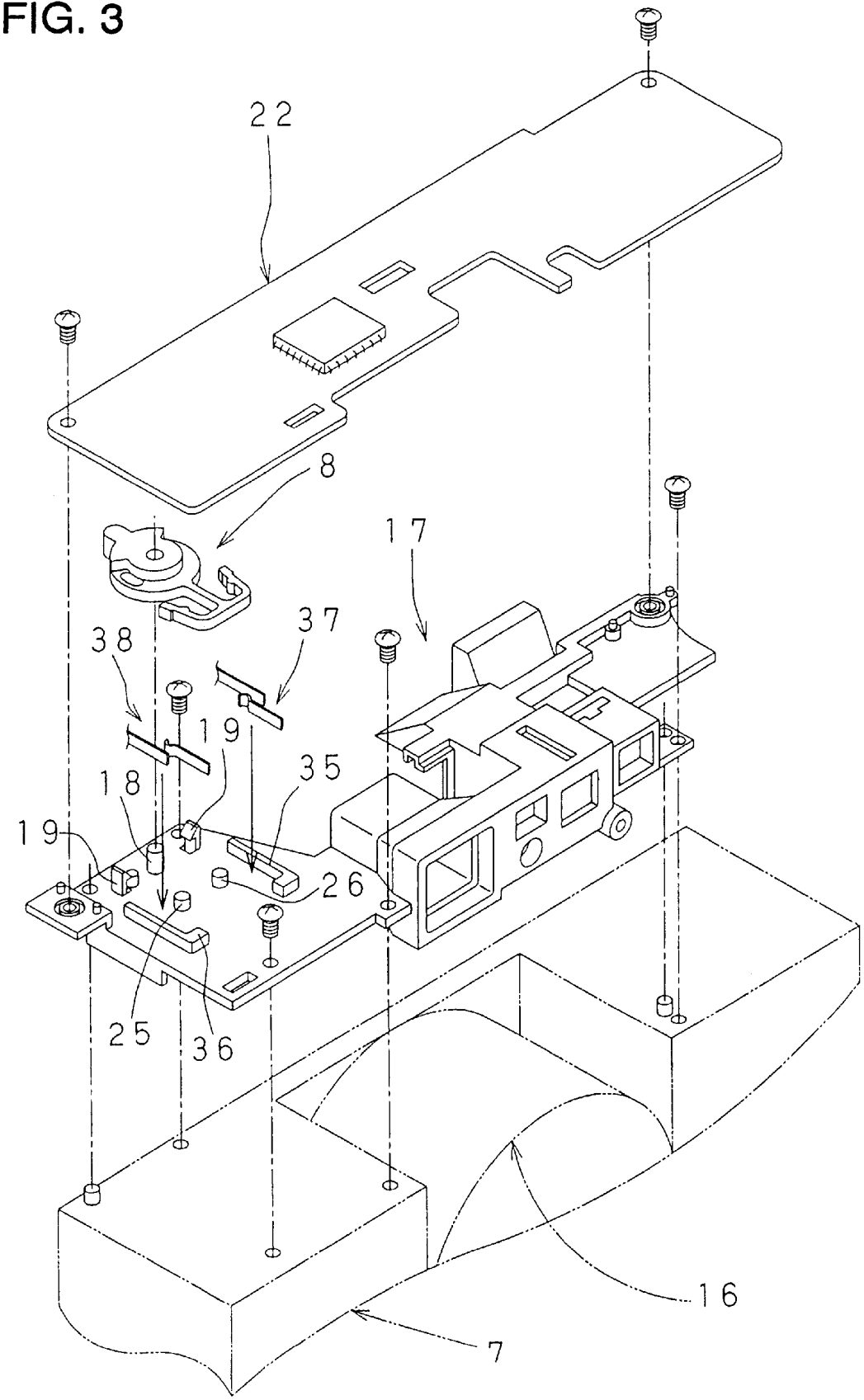
FIG. 3 is an exploded perspective view of the zoom ratio adjusting device.

Referring to the drawings in detail, in particular, to FIGS. 1 through 3 showing a compact camera, which is of a type for use with an IX 240 film cartridge, equipped with a zoom ratio adjusting device in accordance with an embodiment of the invention, a camera body 2 of the compact camera comprises a main body section 7 and front and rear cover sections 9a and 9b. The main body section 7 mounts various camera elements such as a zoom lens, a shutter mechanism, a zooming motor, a focusing motor, etc. thereon. The camera body 2 at its top wall is provided with a shutter release button 3 operated in two steps, namely a first half stroke through which stroke the shutter release button 3 actuates a focusing motor (not shown) to focus a zoom lens 16 on a subject and a second half stroke in which it releases a shutter mechanism. The camera body 2 at its back has a back door 4 which is opened for loading a film cartridge, a finder window 5 for framing an picture in which an eyepiece of a finder is placed, a display panel 6 such as a liquid crystal display panel on which data relating exposure is displayed, and a zoom ratio adjusting member 8 for adjusting a zoom ratio of the zoom lens 16. The zoom ratio adjusting member 8 is forced to remain neutral in position and is swingable right and left or between a telephoto end position and a wide-angle end position. Specifically, the zooming motor continuously rotates in one or normal direction to shift the zoom lens 16 toward the telephoto side while the zoom ratio adjusting member 8 remains turned toward the telephoto end position indicated by a sign "L" in FIG. 2 and continuously rotates in another or reverse direction to shift the zoom lens 16 toward the wide-angle end while the zoom ratio adjusting member 8 remains turned to the wide-angle end position indicated by a sign "W" in FIG. 2.

As seen in FIG. 1 showing the zoom ratio adjusting device including the zoom ratio adjusting member 8, the zoom ratio adjusting member 8 comprises a base disk 11, a knob 13 and a tail member 23 located diametrically opposite to the knob 13. These three parts are formed of plastic material, such as delurine, as one integral member. The base disk 11 is formed with the a center hole 10 which receives a pivot shaft 18 secured to a base plate 17 for rotation. An automatic focusing mechanism and a finder assembly are assembled to the base plate 17 as one unit. The tail member 23 has a U-shaped arm 24 having first and second elastic arms 14 and 15 extending toward the base disk 11 from opposite ends of the arm 24. These first and second elastic arms 14 and 15 work as leaf springs. The zoom ratio adjusting member 8 is placed within the camera body 2 with the knob 13 extending outside the camera body 2 through an opening 12 formed in the rear cover section 9b so as to be touched by a photographer's finger. The base disk 11 is formed with a circular-arcuate peripheral recess 11a and an arcuate guide slot 20 in the peripheral recess 11a.

Figure 4:
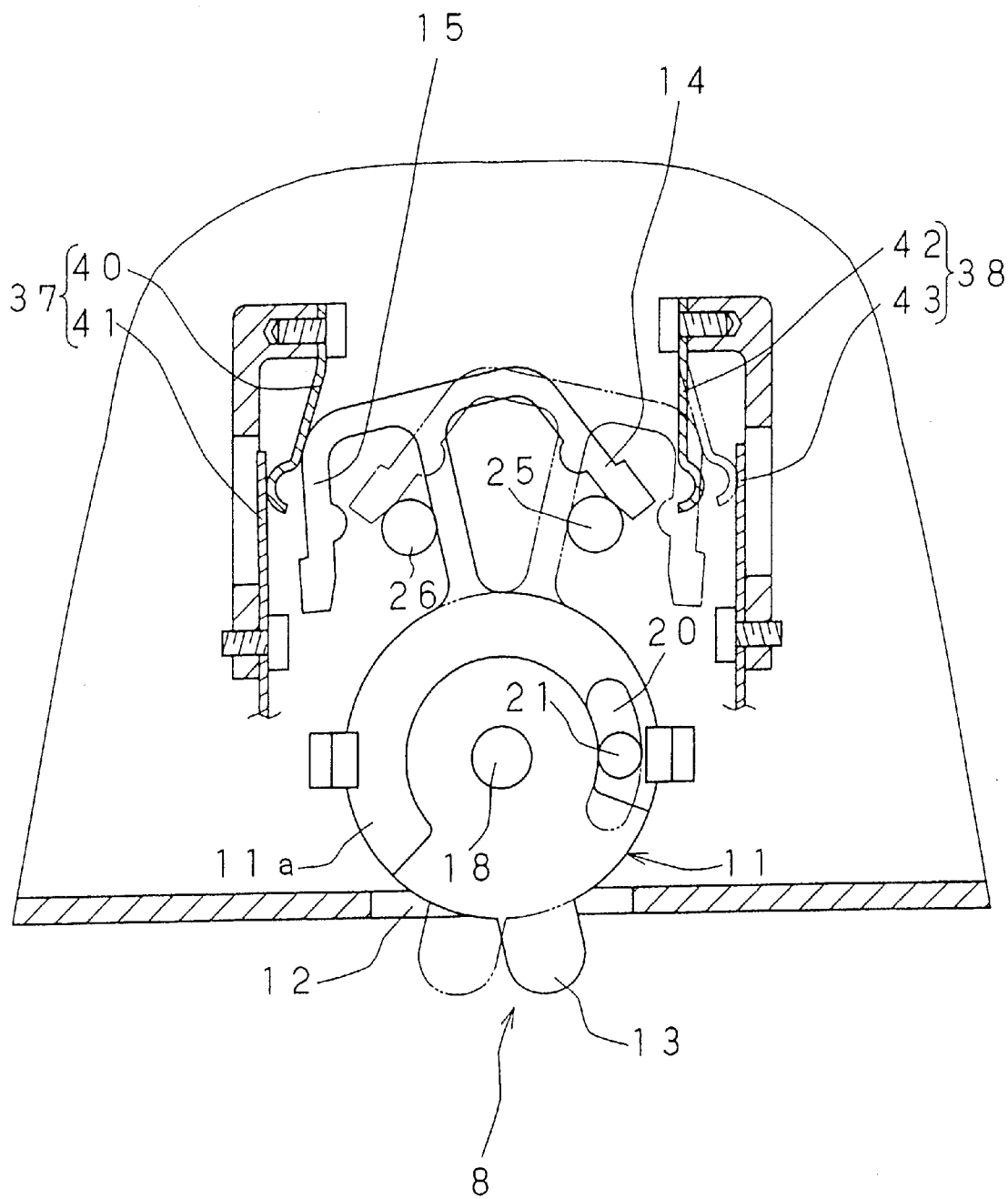
FIG. 4 is a cross-sectional view of essential part of the camera showing operation of a zoom ratio adjusting member.

As shown in FIGS. 3 and 4, the zoom ratio adjusting member 8 is installed to the base plate 17 as well as various optical elements forming parts of a finder mechanism, a light metering mechanism and a focusing mechanism. The base plate 17 is provided with a pair of stationary claws 19 which are secured to the base plate 17 and engageable with the peripheral recess 11a of the zoom ratio adjusting member 8 to hold it therebetween so as to prevent the zoom ratio adjusting member 8 from slipping off from the base plate 17 and a guide pin 21 (see FIG. 1) which is received in the guide slot 20. The zoom ratio adjusting member 8 pivotally mounted on the pivot shaft 18 is permitted to turn between limits defined by the guide slot 20 through engagement between the guide slot 20 and the guide pin 21. The base plate 17 is further provided with a pair of stopper pins 25 and 26 extending between the stem section and the first elastic arm 14 and between the stem section and the second elastic arm 15, respectively. The first elastic arm 14 is formed with a semi-circular projection 28 to keep the zoom ratio adjusting member 8 remain neutral in position while the first elastic arm 14 at its inside wall 14a remains engaged with the stopper pin 25. Similarly, the second elastic arm 15 is formed with a semi-circular projection 29 to keep the zoom ratio adjusting member 8 remain neutral in position while the second elastic arm 15 at its inside wall 15a remains engaged with the stopper pin 26. The zoom ratio adjusting member 8 is designed and adapted to have a distance between the inside walls 15a and 15b of the first and second elastic arms 14 and 15 smaller than a distance between outer sides of the stopper pins 25 and 26, so that the zoom ratio adjusting member 8 is kept in the neutral position by means of the first and second elastic arms 14 and 15 elastically expanded by the stopper pins 25 and 26 while it remains left as it is. When the zoom ratio adjusting member 8 is forced to turn counterclockwise toward the telephoto end position (T) from the neutral position against spring force of the first elastic arm 14 with an effect of elastically deforming the first elastic arm 14 as shown by a solid line in FIG. 4, the second elastic arm 15 is brought into disengagement from the stopper pin 26. On the other hand, when the zoom ratio adjusting member 8 is forced to turn clockwise toward the wide-angle end position (W) from the neutral position against spring force of the second elastic arm 14 with an effect of elastically deforming the second elastic arm 14 as shown by a double-totted line in FIG. 4, the first elastic arm 14 is brought into disengagement from the stopper pin 25. When removing the photographer's finger from the knob 13, the zoom ratio adjusting member 8 returns to the neutral position by means of the restoration of the first elastic arm 14 or the second elastic arm 15.

Figure 5:
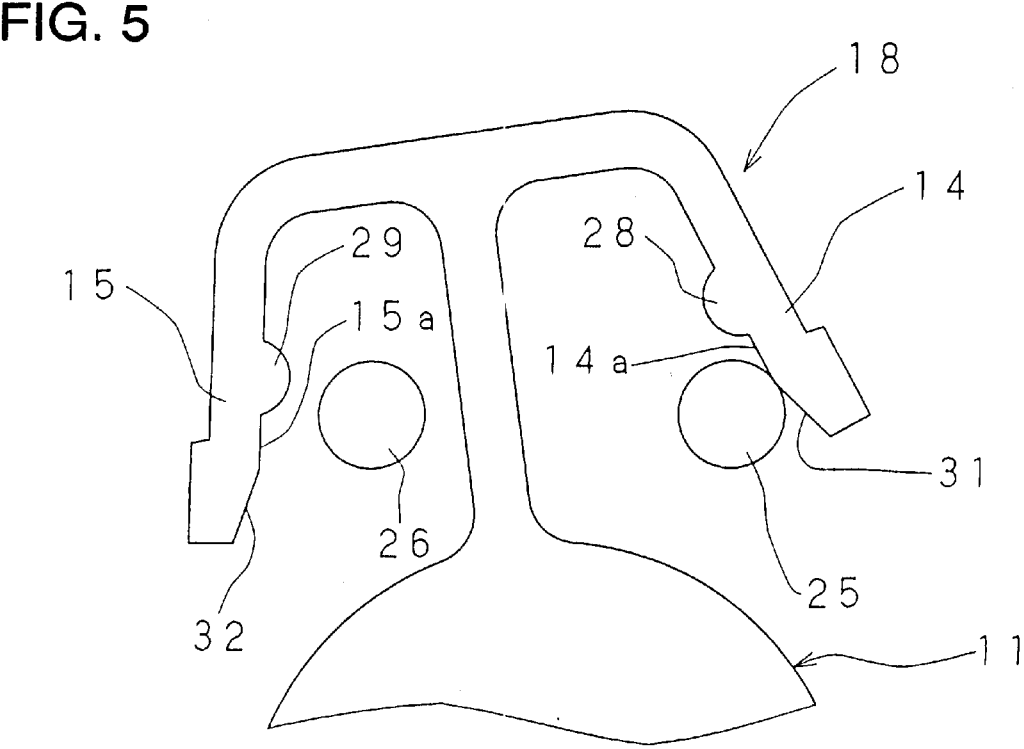
FIG. 5 is an explanatory view showing the zoom ratio adjusting member placed in close proximity to an extreme end position.
Figure 6:
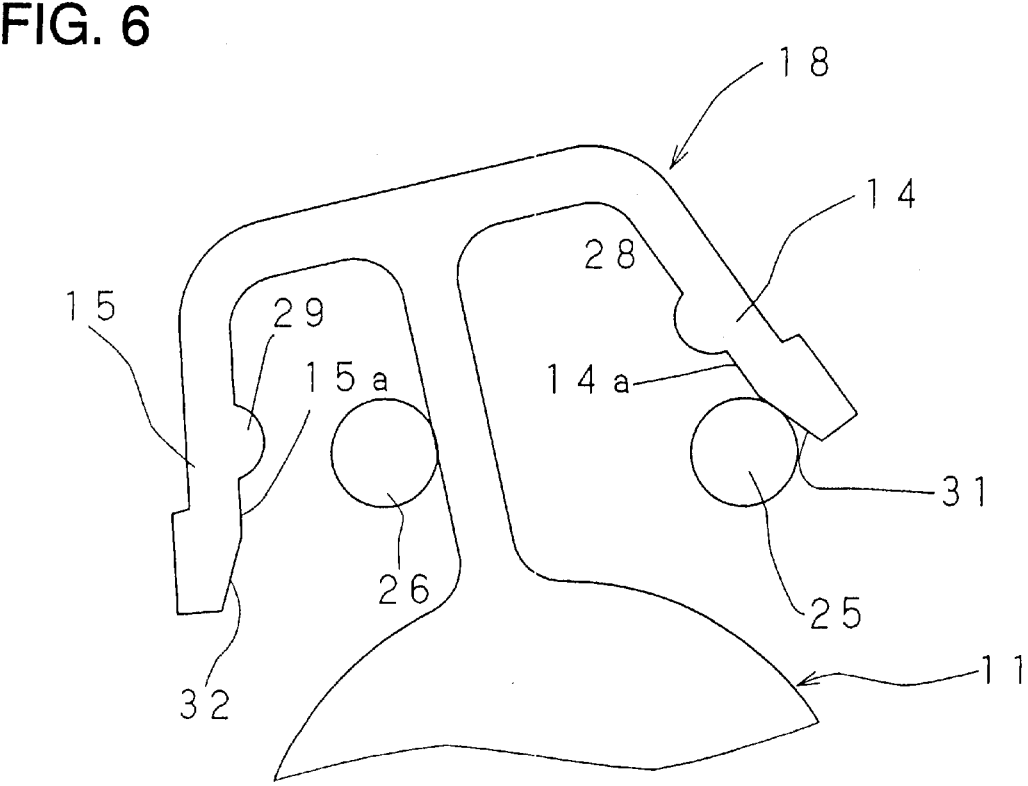
FIG. 6 is an explanatory view showing the zoom ratio adjusting member placed in the extreme end position.

Referring to FIGS. 5 and 6, the first and second elastic arms 14 of the zoom ratio adjusting member 8 have tapered end portions 31 and 32, respectively. Specifically, each tapered end portion 31, 32 has a wall inclined outward at an appropriate angle with respect to an extension of the inside wall 14a, 15a. While the first elastic arm 14 at its inside wall 14a remains engaged with the stopper pin 25 as shown in FIG. 5, the zoom ratio adjusting member 8 suffers gradually increasing reactive force from the stopper pin 25 as it turns in the normal direction. However, the first elastic arm 14 receives significantly decreased reactive force from the stopper pin 25 when the tapered end portion is brought into engagement with the stopper pin 25 as shown in FIG. 6, which provides a feeling of click stop action of the zoom ratio adjusting member 8 and favorable zoom ratio adjusting operation.

Referring back to FIGS. 3 and 4, the base plate 17 is provided with generally L-shaped ribs 35 and 36 located on opposite sides of the zoom ratio adjusting member 8 installed to the base plate 17. The L-shaped rib 35 has a first switch 37 installed thereto which comprises an elastic metal contact 40 secured to the arm of the L-shaped rib 35 and an electrically conductive flexible web 41 facing and separating from the elastic metal contact 40. The electrically conductive flexible web 41 is connected to a camera control circuit printed on a circuit board 22. The elastic metal contact 40 is elastically deformed by the second elastic arm 15 while the zoom ratio adjusting member 8 is turned toward the telephoto end position (T) and is brought into contact with the electrically conductive flexible web 41. Similarly, the L-shaped rib 36 has a second switch 38 installed thereto which comprises an elastic metal contact 42 secured to the arm of the L-shaped rib 36 and an electrically conductive flexible web 43 facing and separating from the elastic metal contact 42. The electrically conductive flexible web 43 is connected to the camera control circuit printed on the circuit board 22. The elastic metal contact 42 is elastically deformed by the second elastic arm 14 while the zoom ratio adjusting member 8 is turned toward the wide-angle end position (W) and is brought into contact with the electrically conductive flexible web 43. When turning the zoom ratio adjusting member 8 toward the telephoto end position (T), the first switch 37 is turned on, so that the zooming motor is energized to rotate in the normal direction in which the zoom lens 16 protrudes to decreasingly changes the zoom ratio. On the other hand, When turning the zoom ratio adjusting member 8 toward the wide-angle end position (W), the second switch 38 is turned on, so that the zooming motor is energized to rotate in the reverse direction in which the zoom lens 16 retracts to increasingly changes the zoom ratio.

With regard to assembling the zoom ratio adjusting device in accordance with an embodiment of the invention to the camera, the base plate 17 to which various parts of the automatic focusing mechanism and the finder mechanism are installed, the printed circuit board 22, the zoom lens 16, etc. are assembled to the main body section 7 on a factory assembling line. Specifically, the elastic metal contacts 40 and 42 and the electrically conductive flexible webs 41 and 43 are secured to the base plate 17 by set screws. The zoom ratio adjusting member 8 separately provided in a plastic forming line is attached to the base plate 17 by fitting the pivot pin 18 and the guide pin 21 into the center hole 10 and the guide slot 20 of the zoom ratio adjusting member 8, respectively, and placing the peripheral recess 11a of the zoom ratio adjusting member 8 under the stationary claws 19. While attaching the zoom ratio adjusting member 8 to the base plate 17, the first and second elastic arms 14 and 15 of the zoom ratio adjusting member 8 are expanded outwardly, and then brought into engagement with the stopper pins 25 and 25 from the outside.

As described above, the zoom ratio adjusting device of the invention has a reduced number of parts as compared with conventional devices and easily assembled to the camera. Furthermore, the zoom ratio adjusting device assembled to the camera is certainly prevented from slipping off the base plate 17 by means of engagement between the peripheral recess 11a of the zoom ratio adjusting member 8 and the stationary claws 19 of the base plate 17. The zoom ratio adjusting device thus structured provides a decrease in cost and an increase in assembling efficiency.

The camera thus assembled is inspected and shipped. The photographer opens the back door 4 to load a film cartridge in the camera. For taking a picture, the photographer views a subject through the finder window 5 to frame the subject and operates the zoom ratio adjusting member 8 to adjust the zoom ratio of the zoom lens 16. When exerting force on the knob 13 toward the telephoto end position (T) with a finger, the zoom ratio adjusting member 8 is turned counterclockwise causing deformation of the first elastic arm 14 against the stopper pin 25. When the zoom ratio adjusting member 8 turns until the guide pin 21 in the guide slot 20 restricts rotation of the zoom ratio adjusting member 8, the tapered end portion of the first elastic arm 14 is brought into engagement with the stopper pin 25 as shown in FIG. 6, the zoom ratio adjusting member 8 suffers sharply reduced reactive force from the stopper pin 25 with an effect of giving the photographer a feeling of click stop action of the zoom ratio adjusting member 8. At the same time, the second elastic arm 15 of the zoom ratio adjusting member 8 forces the elastic metal contact 40 to be brought into contact with the electrically conductive flexible web 41, so as to tune on the first switch 37. When the first switch 37 is turned on, it provides and sends a signal to the camera control circuit printed on the circuit board 22 to actuate the zooming motor to rotate in the normal direction. While the first switch 37 remains turned on, the zooming motor continuously rotates to protrude the zoom lens so as to decreasingly changes the zoom ratio of the zoom lens 16. When releasing the zoom ratio adjusting member 8 at achievement of a desired zoom ratio, the zoom ratio adjusting member 8 returns to its neutral position through restoration of the first elastic arm 14 with the result of removing the elastic metal contact 40 apart from the electrically conductive flexible web 41, so as to stop the zooming motor. As a result, the zoom lens 16 is placed in position with the desired zoom ratio. The shutter button 3 is depressed in the first half stroke to focus the zoom lens 16 on the subject and further depressed in the second half stroke to release the shutter. Subsequently to the shutter release, the film is automatically advanced by one frame.

When exerting force on the knob 13 toward the wide-angle end position (W) with a finger, the zoom ratio adjusting member 8 is turned clockwise causing deformation of the second elastic arm 15 against the stopper pin 26. When the zoom ratio adjusting member 8 turns until the guide pin 21 in the guide slot 20 restricts rotation of the zoom ratio adjusting member 8, the tapered end portion of the second elastic arm 15 is brought into engagement with the stopper pin 26 as shown by a double-dotted line in FIG. 4, the zoom ratio adjusting member 8 suffers sharply reduced reactive force from the stopper pin 26 with an effect of giving the photographer a feeling of click stop action of the zoom ratio adjusting member 8. At the same time, the first elastic arm 16 of the zoom ratio adjusting member 8 forces the elastic metal contact 42 to be brought into contact with the electrically conductive flexible web 43, so as to tune on the second switch 38. When the second switch 38 is turned on, it provides and sends a signal to the camera control circuit printed on the circuit board 22 to actuate the zooming motor to rotate in the reverse direction. While the second switch 38 remains turned on, the zooming motor continuously rotates to retract the zoom lens so as to increasingly changes the zoom ratio of the zoom lens 16. When releasing the zoom ratio adjusting member 8 at achievement of a desired zoom ratio, the zoom ratio adjusting member 8 returns to its neutral position through restoration of the second elastic arm 15 with the result of removing the elastic metal contact 42 apart from the electrically conductive flexible web 42, so as to stop the zooming motor. As a result, the zoom lens 16 is placed in position with the desired zoom ratio. The shutter button 3 is depressed in the first half stroke to focus the zoom lens 16 on the subject and further depressed in the second half stroke to release the shutter. Subsequently to the shutter release, the film is automatically advanced by one frame. The zoom ratio adjusting device is constructed by a small number of parts, which gets less faults and provides increased operational reliability. Furthermore, during turning the zoom ratio adjusting member 8, the photographer can have a feeling that the first or second switch 37 or 38 is turned on from a sharp decrease in reactive force exerting on the photographer's finger through the zoom ratio adjusting member 8.

Figure 7:
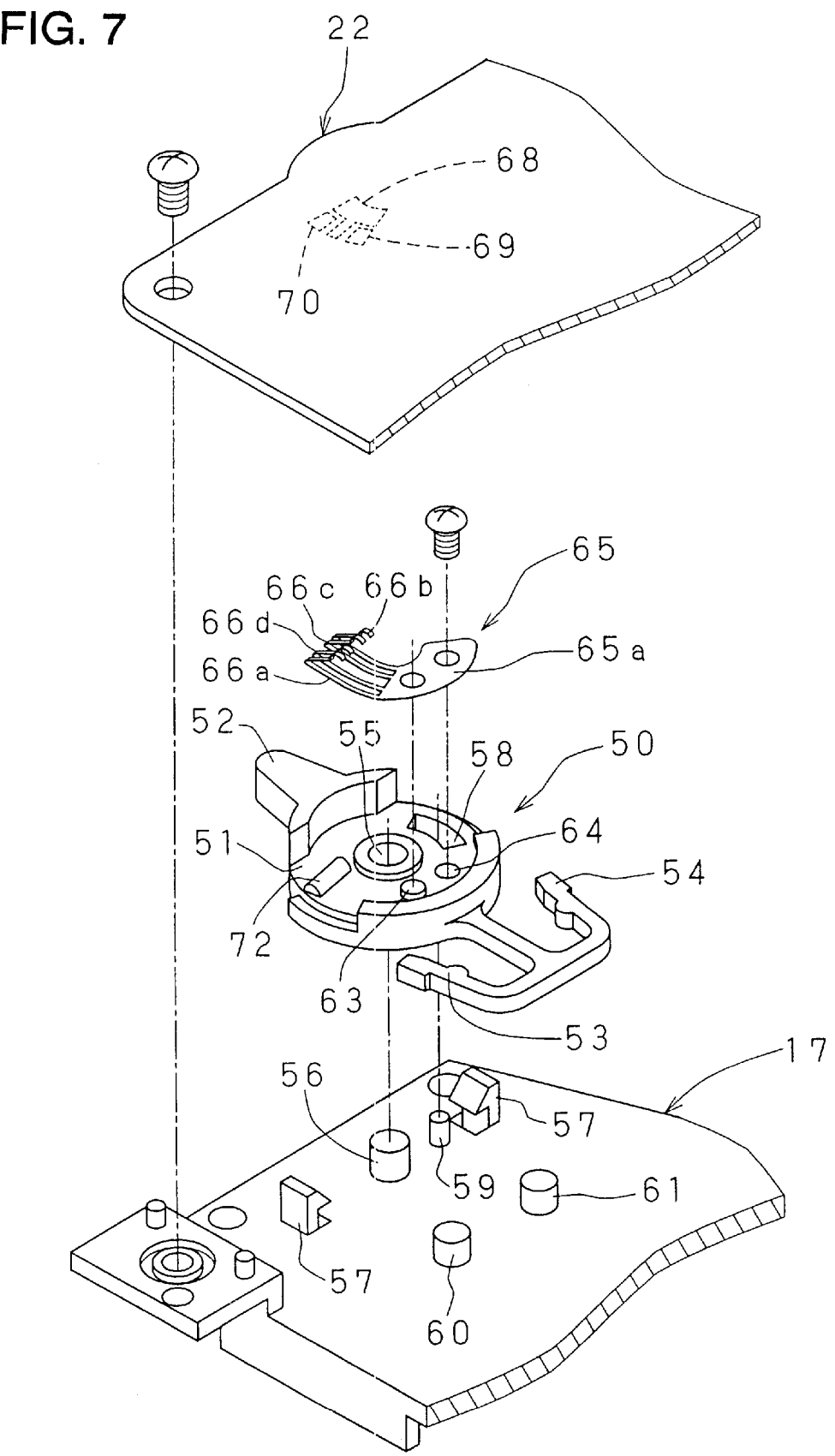
FIG. 7 is an exploded perspective view of a zoom ratio adjusting device in accordance with another preferred embodiment of the invention.
Figure 8:
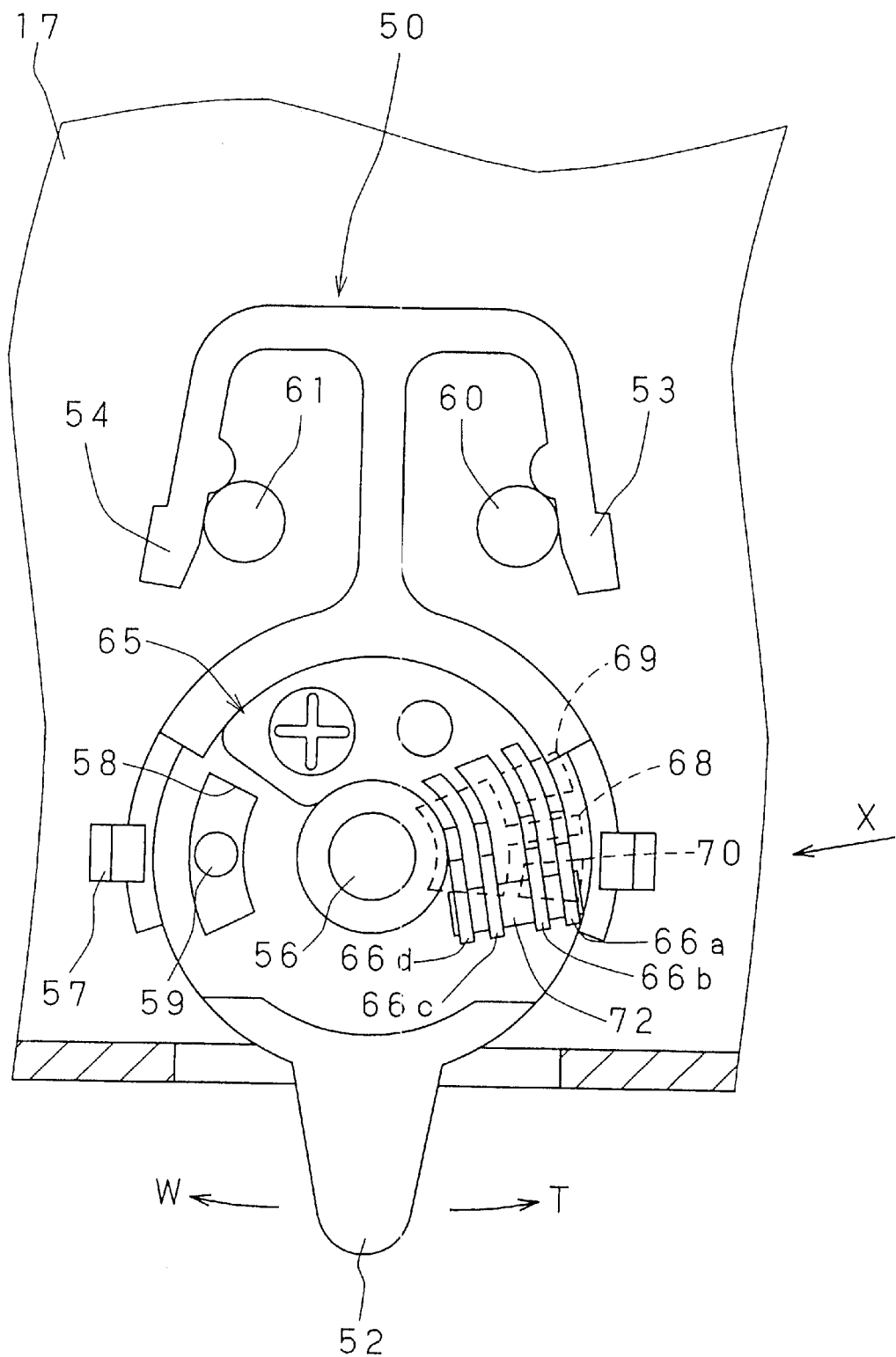
FIG. 8 is a cross-sectional view of essential part of a camera equipped with the zoom ratio adjusting device.
Figure 9:
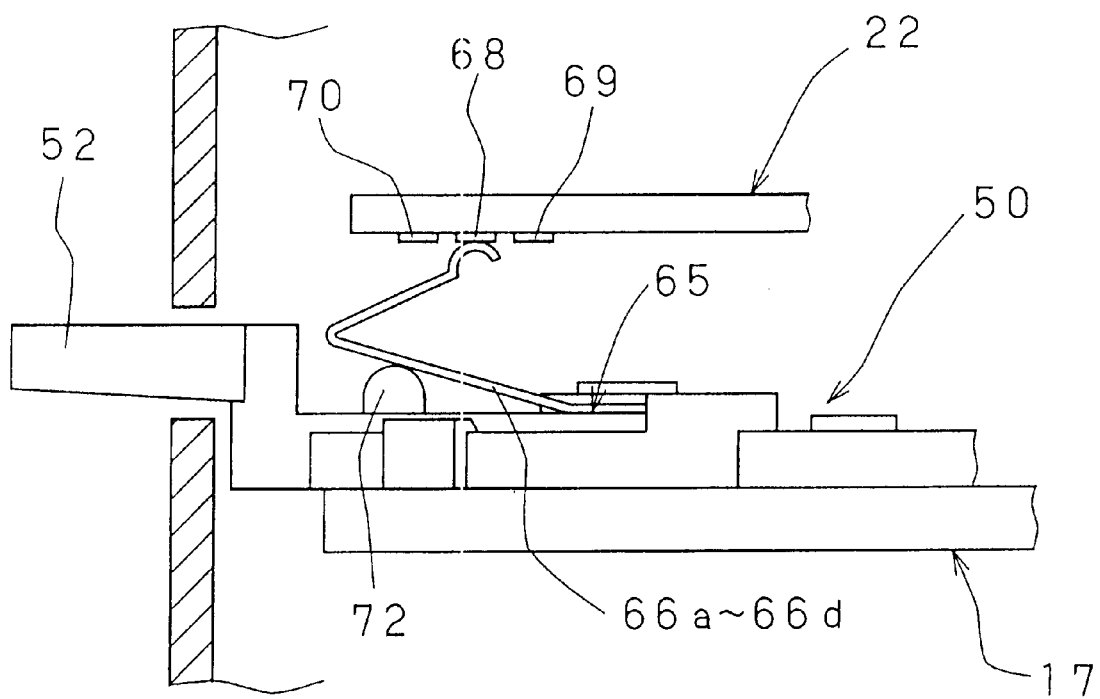
FIG. 9 is a side view as viewed along a line indicated by an arrow X.

The elastic metal contact 40, 42 of each switch 37, 38 may be formed structurally integral with the zoom ratio adjusting member 8 as shown in FIGS. 7 through 9.

Referring to FIGS. 7 through 9, a zoom ratio adjusting member 50 comprises a base disk 51, a knob 52 and first and second elastic arms 53 and 54 which are formed as one integral member. The base disk 11 is formed with the a center hole 55 which receives a pivot shaft 56 secured to a base plate 17 for rotation. The base disk 11 is formed with an arcuate guide slot 58 and holes 63 and 64 each of which is formed with internal threads. An elastic metal contact arrangement 65 is secured to the base disk 11 by set screws. The base plate 17 is provided with a pair of stationary claws 57 which are secured to the base plate 17 and engageable with the periphery of the zoom ratio adjusting member 50 and a guide pin 59 which is received in the guide slot 58 to restrict rotation of the zoom ratio adjusting member 50. The zoom ratio adjusting member 50 pivotally mounted on the pivot shaft 56 is permitted to turn between limits defined by the guide slot 58 through engagement between the guide slot 58 and the guide pin 56 and is prevented from slipping off from the base plate 17 by the stationary claws 57. The base plate 17 is further provided with a pair of stopper pins 60 and 61. The zoom ratio adjusting member 50 is designed and adapted to have a distance between the first and second elastic arms 53 and 54 smaller than a distance between the stopper pins 25 and 26, so that the zoom ratio adjusting member 50 is kept in the neutral position by means of the first and second elastic arms 53 and 54 elastically expanded by the stopper pins 60 and 61.

The elastic metal slide contact arrangement 65 comprises a base section 65a and four generally V-shaped elastic metal slide contacts 66a–66d integrally formed with the base section 65a and extending in a direction in which the zoom ratio adjusting member 50 turns. These V-shaped elastic metal slide contacts 66a–66d are divided into two groups, namely a first slide contact group 66a and 66b and a second slide contact group 66c and 66d. As shown in detail in FIG. 9, each V-shaped elastic metal slide contact 66a–66d is formed with a semi-circular contact tip 68 and arranged with its top in alignment with a direction of rotation of the zoom ratio adjusting member 50. The base disk 51 of the zoom ratio adjusting member 50 is provided with a support projection 72 having a semi-circular cross-section to support the V-shaped elastic metal slide contacts 66a–66d from the under sides so as to bring each semi-circular contact tip in appropriate contact against a stationary contact arrangement installed to the under side of a circuit board 22 on which a camera control circuit is printed and which is installed to the base plate 17. The stationary contact arrangement comprises a generally T-shaped ground contact 68 and two zooming stationary contacts, namely a telephoto contact 69 and a wide-angle contact 70, arranged on opposite sides of the ground contact 68. The slide contact arrangement is adapted such that the first group slide contacts 66a and 66b slide over the ground contact 68, the telephoto contact 69 and the wide-angle contact 70 and the second group slide contacts 66c and 66d remain contacted with the ground contact 68. While the zoom ratio adjusting member 50 is in its neutral position, all of the first and second group slide contacts 66a–66d are in contact with the ground contact 68, so that the zooming motor is not actuated. When the zoom ratio adjusting member 50 turns counterclockwise toward the telephoto end position (L), the first group slide contacts 66a and 66b are brought into contact with the telephoto contact 69, so that the telephoto contact 69 and the ground contact 68 are electrically coupled to each other to actuate the zooming motor to continuously rotate in the normal direction to protrude the zoom lens 16 toward the telephoto end. On the other hand, when the zoom ratio adjusting member 50 turns clockwise toward the wide-angle end position (W), the first group slide contacts 66a and 66b are brought into contact with the wide-angle contact 70 so that the wide-angle contact 70 and the ground contact 68 are electrically coupled to each other to actuate the zooming motor to continuously rotate in the reverse direction to retract the zoom lens 16 toward the wide-angle end. During turning the zoom ratio adjusting member 50 toward the telephoto end position (T), while frictional resistance caused between the slide contact arrangement and the stationary contact arrangement acts in a direction in which the slide contacts 66a–66d are hard to produce elastic reactive force, so that they are apt to bend in excess with an effect of inappropriate contact with the stationary contact arrangement, however, the support projection 72 supports the slide contacts 66a–66d from the under side, they remains stable in contact with the stationary contact arrangement.

As described above, the zoom ratio adjusting device according to the embodiment which has the zoom ratio adjusting member 50 provided with the slide contact arrangement slidable on the stationary contact arrangement forming part of the camera control circuit printed on the base plate 17 provides a reduction in number of parts to be installed to the base plate 17 and makes it possible to miniaturize the camera body. The combination of the support projection 72 and the V-shaped elastic metal slide contacts 66a–66d provides reliable switch action between the slide contact arrangement and the stationary contact arrangement.

The U-shaped arm 24 having first and second elastic arms 14 and 15 may be replaced by separate elastic arms extending radially from the base disk 11 or 51. The present invention may be applied to zoom ratio adjusting member slidable right and left, or otherwise up and down.

According to the invention, while the zoom ratio adjusting device is structured from a reduced number of parts and at low costs, it holds the zoom ratio adjusting member 8, 50 in a neutral position and reliably causes the zoom ratio adjusting member 8, 50 to return to the neutral position after zoom ratio adjusting operation. Further, in order for the zoom ratio adjusting device to provide a click stop feeling, it is not necessary to use extra parts, which is desirable to provide improved and reliable operation of the zoom ratio adjusting member 8, 50. The zoom ratio adjusting device is simple in structure and operation with an effect of reducing an occurrence of operational errors and provides an increase in assembling appropriateness. The use of slide contact arrangement installed to the zoom ratio adjusting member 50 provides a reduction in space necessary to accommodate the zoom ratio adjusting device, which is desirable for miniaturization of the camera body. The use of a combination of the support projection 72 and the V-shaped elastic metal slide contacts 66a–66d provides reliable and smooth switch action between the slide contact arrangement and the stationary contact arrangement.

It is to be understood that the present invention may be embodied with various changes, modifications and improvements, which may occur to those skilled in the art, without departing from the spirit and scope of the invention defined in the following claims.

What is claimed is:

1. A zoom ratio adjusting device for adjusting a zoom ratio of a zoom lens of a camera between a telephoto end and a wide-angle end, said zoom ratio adjusting device comprising:

zoom lens drive means for driving said zoom lens between a telephoto end and a wide-angle end;

a zoom ratio adjusting member movable between a telephoto end position and a wide-angle end position provided on opposite side of a neutral position for actuating said zoom lens drive means to drive said zoom lens toward said telephoto end while operated toward said telephoto end position from said neutral position and actuating said zoom lens drive means to drive said zoom lens toward said wide-angle end while operated toward said wide-angle end position from said neutral position; and elastic means formed integrally with said zoom ratio adjusting member for returning said zoom ratio adjusting member to said neutral position from each of said telephoto end position and said wide-angle end position and holding said zoom ratio adjusting member in said neutral position while said zoom ratio adjusting member is released.

2. The zoom ratio adjusting device as defined in claim 1, wherein said elastic member comprises a first return arm elastically deformed while said zoom ratio adjusting member is operated toward said telephoto end position and a second arm section elastically deformed while said zoom ratio adjusting member is operated toward said wide-angle end position.

3. The zoom ratio adjusting device as defined in claim 2, wherein said part is a base plate secured to said camera body for mounting optical elements thereon.

4. The zoom ratio adjusting device as defined in claim 2, and further comprising a stationary first stopper pin secured to part of a camera body for deforming said first return arm to accumulate reactive force while said zoom ratio adjusting member is operated toward said telephoto end position and a stationary second stopper pin secured to part of said camera body for deforming said second return arm to accumulate reactive force while said zoom ratio adjusting member is operated toward said wide-angle end position.

5. The zoom ratio adjusting device as defined in claim 4, wherein each of said first and second return arms is formed with a projection engageable with associated one of said first and second stopper pins and has a tapered end portion which is brought into contact with said associated stopper pin when said zoom ratio adjusting member reaches closely each of said telephoto end position and a wide-angle end position.

6. The zoom ratio adjusting device as defined in claim 1, and further comprising guide means secured to part of said camera body for guiding movement of said zoom ratio adjusting member.

7. A zoom ratio adjusting device for adjusting a zoom ratio of a zoom lens of a camera between a telephoto end and a wide-angle end, said zoom ratio adjusting device comprising:

a reversible electric motor for driving said zoom lens between a telephoto end and a wide-angle end;

a zoom ratio adjusting member movable between a telephoto end position and a wide-angle end position provided on opposite side of a neutral position elastic means formed integrally with said zoom ratio adjusting member for returning said zoom ratio adjusting member to said neutral position from each of said telephoto end position and said wide-angle end position and holding said zoom ratio adjusting member in said neutral position while said zoom ratio adjusting member is released; and a switch arrangement disposed between said zoom ratio adjusting member and part of a camera body for actuating said reversible electric motor in one direction to drive said zoom lens toward said telephoto end while said zoom ratio adjusting member is operated toward said telephoto end position from said neutral position and actuating said reversible electric motor in another direction to drive said zoom lens toward said wide-angle end while said zoom ratio adjusting member is operated toward said wide-angle end position from said neutral position.

8. The zoom ratio adjusting device as defined in claim 7, wherein said part is a circuit board on which a camera control circuit is printed.

9. The zoom ratio adjusting device as defined in claim 7, wherein said elastic member comprises a first rerun arm elastically deformed while said zoom ratio adjusting member is operated toward said telephoto end position and a second arm section elastically deformed while said zoom ratio adjusting member is operated toward said wide-angle end position.

10. The zoom ratio adjusting device as defined in claim 9, and further comprising a stationary first stopper pin secured to part of a camera body for deforming said first return arm to accumulate reactive force while said zoom ratio adjusting member is operated toward said telephoto end position and a stationary second stopper pin secured to part of said camera body for deforming said second return arm to accumulate reactive force while said zoom ratio adjusting member is operated toward said wide-angle end position.

11. The zoom ratio adjusting device as defined in claim 10, wherein each of said first and second return arms is formed with a projection engageable with associated one of said first and second stopper pins and has a tapered end portion which is brought into contact with said associated stopper pin when said zoom ratio adjusting member reaches closely each of said telephoto end position and a wide-angle end position.

12. The zoom ratio adjusting device as defined in claim 10, wherein said switch arrangement comprises a first switch which is turned on by said second return arm when said zoom ratio adjusting member reaches said telephoto end position and a second switch which is turned on by said first return arm when said zoom ratio adjusting member reaches a wide-angle end position.

13. The zoom ratio adjusting device as defined in claim 7, wherein said switch arrangement comprises a plurality of elastic metal slide contacts attached to said zoom ratio adjusting member, a first stationary metal contacts electrically connected to a motor drive control circuit with which said elastic metal slide contacts are brought into contact to rotate said electric motor in said one direction when said zoom ratio adjusting member is operated to said telephoto end position, and a second stationary metal contacts electrically connected to said motor drive control circuit with which said elastic metal slide contacts are brought into contact to rotate said electric motor in said other direction when said zoom ratio adjusting member is operated to said wide-angle end position.

14. The zoom ratio adjusting device as defined in claim 13, wherein each said elastic metal slide contact is generally V-shaped in a direction in which the zoom ratio adjusting member moves.

15. The zoom ratio adjusting device as defined in claim 13, and further comprising support means formed on said zoom ratio adjusting member for urging said elastic metal slide contacts against said stationary metal contacts.

16. A camera equipped with a zoom lens and a zoom ratio adjusting device for adjusting a zoom ratio of the zoom lens between a telephoto end and a wide-angle end, said zoom ratio adjusting device comprising:

zoom lens drive means for driving said zoom lens between a telephoto end and a wide-angle end;

a zoom ratio adjusting member movable between a telephoto end position and a wide-angle end position provided on opposite side of a neutral position for actuating said zoom lens drive means to drive said zoom lens toward said telephoto end while operated toward said telephoto end position from said neutral position and actuating said zoom lens drive means to drive said zoom lens toward said wide-angle end while operated toward said wide-angle end position from said neutral position; and elastic means formed integrally with said zoom ratio adjusting member for returning said zoom ratio adjusting member to said neutral position from each of said telephoto end position and said wide-angle end position and holding said zoom ratio adjusting member in said neutral position while said zoom ratio adjusting member is released.

17. A camera equipped with a zoom lens and a zoom ratio adjusting device for adjusting a zoom ratio of the zoom lens between a telephoto end and a wide-angle end, said zoom ratio adjusting device comprising:

a reversible electric motor for driving said zoom lens between a telephoto end and a wide-angle end;

a zoom ratio adjusting member movable between a telephoto end position and a wide-angle end position provided on opposite side of a neutral position elastic means formed integrally with said zoom ratio adjusting member for returning said zoom ratio adjusting member to said neutral position from each of said telephoto end position and said wide-angle end position and holding said zoom ratio adjusting member in said neutral position while said zoom ratio adjusting member is released; and a switch arrangement disposed between said zoom ratio adjusting member and part of a camera body for actuating said reversible electric motor in one direction to drive said zoom lens toward said telephoto end while said zoom ratio adjusting member is operated toward said telephoto end position from said neutral position and actuating said reversible electric motor in another direction to drive said zoom lens toward said wide-angle end while said zoom ratio adjusting member is operated toward said wide-angle end position from said neutral position.

* * * * *